United States Patent [19]

Saito

[11] Patent Number: 5,673,162

[45] Date of Patent: Sep. 30, 1997

[54] MAGNETORESISTIVE HEAD WITH SOFT ADJACENT LAYER COMPRISING AMORPHOUS MAGNETIC MATERIAL

[75] Inventor: Masamichi Saito, Niigata-ken, Japan

[73] Assignee: Alps Electric Co., Ltd., Tokyo, Japan

[21] Appl. No.: 624,733

[22] Filed: Mar. 26, 1996

[30] Foreign Application Priority Data

Apr. 7, 1995 [JP] Japan ..................................... 7-108122

[51] Int. Cl.$^6$ .................................. G11B 5/39; B32B 9/00
[52] U.S. Cl. ............................................. 360/113; 428/692
[58] Field of Search ........................... 360/113, 125, 360/126; 428/692; 324/252; 338/32 R; 365/158

[56] References Cited

U.S. PATENT DOCUMENTS

| | | | |
|---|---|---|---|
| 5,057,380 | 10/1991 | Hayashi et al. | 438/692 |
| 5,285,339 | 2/1994 | Chen et al. | 360/113 |
| 5,304,975 | 4/1994 | Saito et al. | 338/32 R |
| 5,327,313 | 7/1994 | Nishioka et al. | 360/113 |
| 5,337,203 | 8/1994 | Kitada et al. | 360/113 |
| 5,432,734 | 7/1995 | Kawano et al. | 365/158 |
| 5,459,687 | 10/1995 | Sakakima et al. | 365/158 |
| 5,471,358 | 11/1995 | Tadokoro et al. | 360/113 |
| 5,549,978 | 8/1996 | Iwasaki et al. | 428/692 |

*Primary Examiner*—Jefferson Evans
*Attorney, Agent, or Firm*—Guy W. Shoup; Patrick T. Bever

[57] ABSTRACT

A magnetoresistive head having a soft magnetic layer which comprises a Co—Fe—Ta amorphous magnetic material and applies a transverse bias magnetic field to a magnetoresistive layer. The amorphous magnetic material has such properties that the induced anisotropy is readily attained in the lateral direction, the rate of magnetoresistance change ($\Delta \rho/\rho$) is low, the magnetization stability in the lateral direction is enhanced, and Barkhausen noise is decreased. Since tantalum, one of the amorphous elements, sets the magnetostriction toward the minus side while iron (Fe) sets the magnetostriction toward the plus side, it is possible to control the magnetostriction of the soft adjacent layer by selecting the iron (Fe) concentration and to prevent the magnetoelastic effect from disturbing the magnetization stability in the lateral direction.

12 Claims, 9 Drawing Sheets

MAGNETORESISTIVE HEAD WITH SOFT ADJACENT LAYER COMPRISING AMORPHOUS MAGNETIC MATERIAL

BACKGROUND OF THE INVENTION

1. Field of the Invention

The present invention relates to a head which detects magnetism utilizing a magnetoresistance effect, and more particularly, the present invention relates to a magnetoresistive head of which a soft magnetic layer (hereinafter referred to as a SAL layer) has been improved so as to suppress Barkhausen noise.

2. Description of the Related Art

Conventionally, a three-layer element 4 composed of a SAL (soft adjacent layer; 4a, a non-magnetic layer (hereinafter referred to as a shunt 4b, and a magnetoresistive layer 4c (hereinafter referred to as a MR layer), as is shown in FIG. 10, is applied to a magnetoresistive head for detecting leakage of a magnetic field from a recording medium or the like. In general, the MR layer 4c, the shunt layer 4b, and the SAL 4a are made of a Fe—Ni—; alloy (permalloy), tantalum (Ta), and a Ni—Fe—Nb alloy, respectively.

The three-layer element 4 connects with a longitudinal bias layer which applies a longitudinal bias magnetic field to the magnetoresistive layer 4c in the X axis direction. The longitudinal bias layer is a hard bias layer or an exchange bias layer. When an electric current is applied to the MR layer 4c, the resulting magnetic field thereof magnetizes the SAL 4a in the lateral direction (the Y axis direction: the same direction as the magnetic field to be detected), and a lateral bias magnetic field is thereby applied to the MR layer 4c. By those lateral and longitudinal bias magnetic fields, the magnetization direction of the MR layer 4c is set up in the direction of an arrow shown in FIG. 10. Thus, a linear relation exists between the magnetic field strength and the resistance change to be detected by the MR layer 4c.

The requirements for the SAL layer 4a of the above three-layer element are the following.

(Requirement 1) When the direction of the film stress in the SAL 4a is nonuniform and the magnetostriction $\lambda s$ is large, the SAL 4a is not sufficiently saturated in the lateral direction (the Y axis direction) because of a magnetoelastic effect, thus resulting in Barkhausen noise. Meanwhile, when the film stress in the SAL 4a is uniform, for example, when it exists as a tensile stress in the lateral direction, it is desirable to set up positive magnetostriction since sufficient saturation magnetization in the lateral direction is attained for the SAL under such conditions.

(Requirement 2) The specific resistance $\rho$ of the SAL 4a is required to be as high as possible. When the specific resistance $\rho$ is low, the output for detecting the magnetism of the MR layer 4c decreases because the detection electric current to be applied thereto partially flows into the SAL 4a.

(Requirement 3) It is preferred that the rate of magnetoresistance change $(\Delta\rho/\rho)$ is small. When the $\alpha\rho/\rho$ is large, the magnetization stability of the SAL 4a in the lateral direction is disturbed by an external magnetic field in the Y axis direction, which direction is to be detected, resulting in an increase in Barkhausen noise.

(Requirement 4) It is preferred that the saturation magnetization Bs is 1.0 T (tesla) or less. In other words, it is preferable that the magnetization saturated in the SAL layer 4a be smaller than that saturated in the MR layer 4c. The saturation magnetization Bs and the thickness of each of the layers determine the magnetization saturated therein. In addition, to detect the magnetic field recorded at high density in a recording medium, the SAL 4a and the MR layer 4c must be thin layers, and they are generally formed to almost the same thickness. Since the saturation magnetization Bs of the MR layer 4c is approximately 1.0 T, that of the SAL 4a is preferably 1.0 T or less, and more preferably, approximately from 1.0 to 0.6 T.

(Requirement 5) With respect to the fact that the SAL 4a applies a transverse bias magnetic field to the MR layer 4c, the desirable properties of the SAL 4a are such that the induced anisotropic magnetic field (Hk) thereof is large and the induced anisotropy can be readily set up in the lateral direction by, for instance, film-forming in a magnetic field or annealing in a magnetic field after film-forming. The induced anisotropic magnetic field of 30 Oe (oersted) or more is preferable to stabilize the magnetization of the SAL 4a in the lateral direction.

Materials of the SAL 4a should satisfy all of the abovementioned requirements 1 to 5. The left column of Table 1 shows the properties, concerning the requirements 1 to 5, of an Ni—Fe—Nb alloy used for the SAL 4a of the conventional three-layer element 4. The specific resistance $\rho$, which is mentioned in the requirement 2, is low and the induced anisotropic magnetic field is significantly small while the rate of magnetoresistance change $(\Delta\rho/\rho)$ is relatively high.

As described above, since the SAL 4a of the conventional three-layer element 4 has relatively low specific resistance $\rho$, the detection electric current to be applied to the MR layer 4c partially flows into the SAL 4a, resulting in a decrease in the output for detecting magnetism. Further, the induced anisotropic magnetic field (Hk) of the conventional SAL 4a is small and the magnetization is not sufficiently saturated in the lateral direction (the Y axis direction). Moreover, the magnetization stability is readily disturbed by an external magnetic field, such as a recording medium, because of the relatively high rate of magnetoresistance change $(\Delta\rho/\rho)$. Therefore, there is a restriction on decreasing Barkhausen noise.

SUMMARY OF THE INVENTION

Given the above-described requirements, it is an object of the present invention to provide a magnetoresistive head with decreased Barkhausen noise by preparing a SAL (soft adjacent layer); from a material providing a large, induced anisotropic magnetic field in the lateral direction and by decreasing the rate of magnetoresistance change of the SAL.

It is another object of the present invention to provide a magnetoresistive head in which the concentration of each element is set up to enhance the magnetization stability in the lateral direction in both cases of the film stress in the SAL being either uniform or nonuniform, utilizing the influence of the relation between the film stress and the magnetostriction on the magnetization.

It is still another object of the present invention to provide a magnetoresistive head which can provide high output for detecting magnetism by increasing the specific resistance of the SAL so as to decrease the electric current flowing thereto.

The first aspect of the present invention is a magnetoresistive head comprising a magnetoresistive layer and a soft magnetic layer stacked with a non-magnetic layer therebetween; and an electric-current supplying path for the magnetoresistive layer; wherein the soft magnetic layer comprises an amorphous magnetic material comprising magnetic elements including cobalt (Co) and iron (Fe) and an amorphous element X.

The second aspect of the present invention is a magnetoresistive head described in the foregoing first aspect, wherein the amorphous element X is at least one element selected from the group consisting of tantalum (Ta), niobium (Nb), yttrium (Y), nickel (Ni), boron (B), silicon (Si), titanium (Ti), vanadium (V), chromium (Cr), zirconium (Zr), molybdenum (Mo), hafnium (Hf), and tungsten (W).

The third aspect of the present invention is a magnetoresistive head described in the foregoing first aspect, wherein the cobalt (Co) concentration ranges from 70 to 85 (at %); the iron (Fe) concentration ranges from 0 to 24 (at %); and the amorphous element X concentration ranges from 6 to 30 (at %).

The fourth aspect of the present invention is a magnetoresistive head described in the foregoing first aspect, wherein the strength and the direction of the film stress of the soft magnetic layer are nonuniform; the amorphous element is at least one element selected from the group consisting of tantalum (Ta), niobium (Nb), yttrium (Y), and nickel (Ni); the iron (Fe) concentration ranges from 2 to 6 (at %); the cobalt (Co) concentration ranges from 70 to 83 (at %); and the amorphous element X concentration ranges from 13 to 28 (at %).

The fifth aspect of the present invention is a magnetoresistive head described in the foregoing first aspect, wherein the soft magnetic layer has a uniform film stress; the amorphous element is at least one element selected from the group consisting of tantalum (Ta), niobium (Nb), yttrium (Y), and nickel (Ni); the iron (Fe) concentration ranges from 4 to 24 (at %); the cobalt (Co) concentration ranges from 70 to 82 (at %); and the amorphous element X concentration ranges from 6 to 26 (at %).

The sixth aspect of the present invention is a magnetoresistive head described in the foregoing first aspect, wherein the soft magnetic layer has a uniform film stress; and the amorphous element is at least one element selected from the group consisting of boron (B), silicon (Si), titanium (Ti), vanadium (V), chromium (Cr), zirconium (Zr), molybdenum (Mo), hafnium (Hf), and tungsten (W).

DESCRIPTION OF THE PREFERRED EMBODIMENTS

As described above, it is preferred that the SAL of a three-layer element of a magnetoresistive head be readily provided with an induced anisotropic magnetic field by, for example, film-forming in a magnetic field or by annealing in a magnetic field after film-forming. In addition, a small coercive force is another requirement for the SAL.

To satisfy those requirements, the SAL of the present invention comprises an amorphous material containing a magnetic element. An oriented regular arrangement of the magnetic atoms and an induced anisotropic magnetic field are thereby readily attained in the amorphous material. Further, when the content of the magnetic element increases, the induced anisotropic magnetic field can be applied more easily. A relatively high Curie temperature is required for the SAL, and for this purpose, cobalt (Co) is used as the magnetic element thereof. Moreover, in the present invention, the SAL contains iron (Fe) in addition to cobalt so as to apply the induced anisotropic magnetic field more readily by utilizing different kinds of magnetic elements. Consequently, in the above-described first aspect of the present invention, the SAL comprises cobalt (Co) and iron (Fe) as the magnetic element, and an amorphous element X.

In the second aspect, the above-mentioned amorphous element is at least one element selected from the group consisting of tantalum (Ta), niobium (Nb), yttrium (Y), nickel (Ni), boron (B), silicon (Si), titanium (Ti), vanadium (V), chromium (Cr), zirconium (Zr), molybdenum (Mo), hafnium (Hf), and tungsten (W).

The third aspect indicates a concentration range required for each of cobalt, iron, and an amorphous element X, for which in general tantalum (Ta) is used, to attain an amorphous state for the material composed thereof.

In an amorphous magnetic material composed of cobalt, iron, and an amorphous element X, for which in general tantalum is used, the saturation magnetization of the SAL in the lateral direction becomes easier because of the increased induced anisotropic magnetic field (Hk), as is shown in the right column of Table 1. In addition, since the rate of magnetoresistance change ($\Delta\rho/\rho$) decreases, the magnetization stability of the SAL in the lateral direction is less affected by an external magnetic field. Barkhausen noise can be suppressed since the induced anisotropy can be readily provided and the disturbance of magnetization stability can be decreased. According to the present invention, it is possible to decrease the electric current flowing into the SAL by increasing the specific resistance $\rho$ of the SAL composed of an amorphous magnetic material, thus providing high output for detecting magnetism, as is shown in Table 1.

Figure 7:
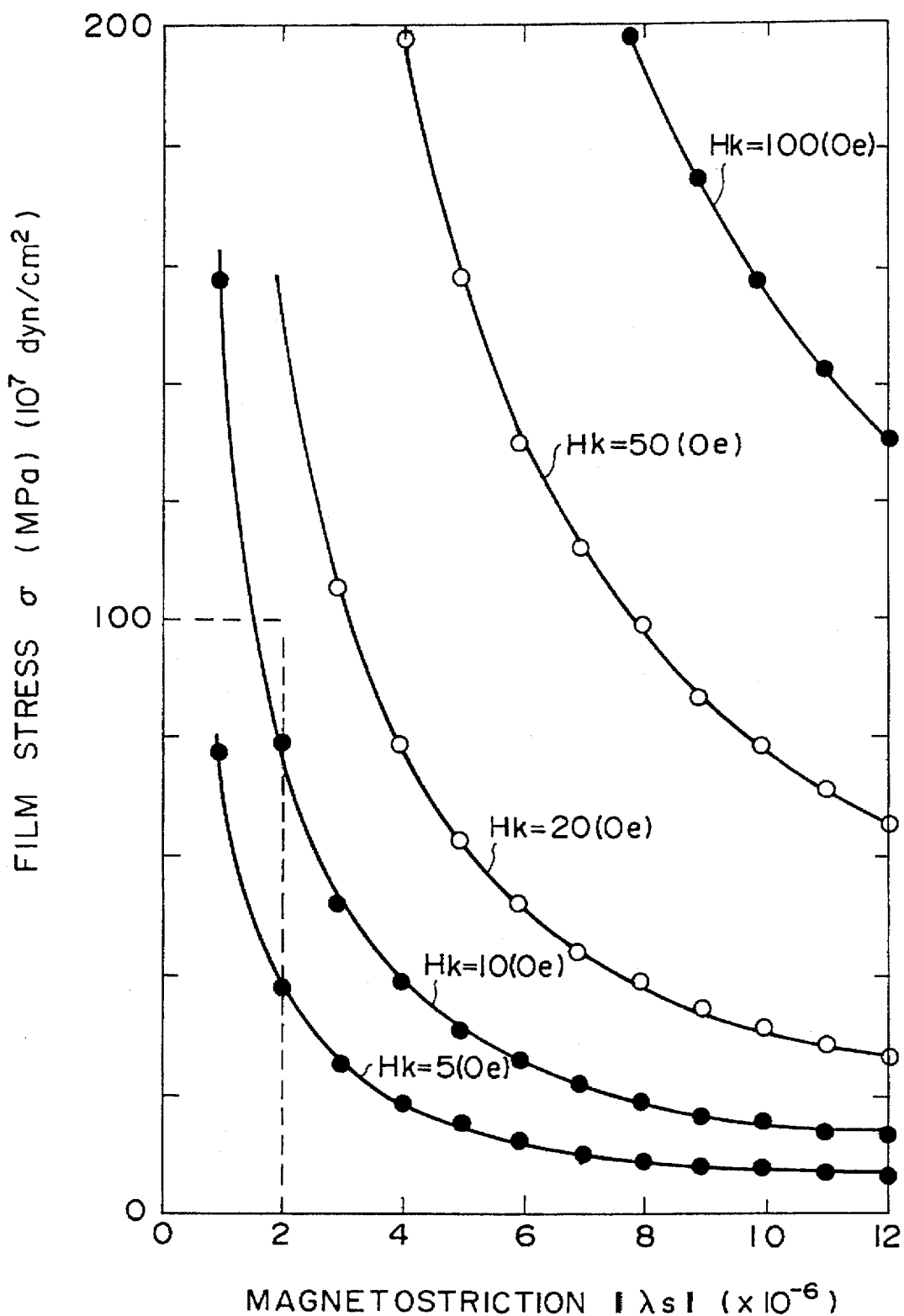
FIG. 7 is a graph showing the anisotropic magnetic field due to a magnetoelastic effect caused by a correlation between the magnetostriction and the film stress in a Co—Fe—Ta alloy amorphous magnetic material of a SAL.

As shown in FIG. 7, the induced anisotropic magnetic field of the SAL in the lateral direction is affected by the correlation between the magnetostriction and the film stress, which is referred to as the magnetoelastic effect. When the SAL exhibits a nonuniform film stress, the induced anisotropic magnetic field due to the magnetoelastic effect renders the magnetization in the lateral direction less saturated. In other words, the induced anisotropic magnetic field due to the magnetoelastic effect impairs the magnetization stability in the lateral direction, thus it is necessary to maintain a low absolute value of the magnetostriction. In such a case, according to the present invention, an amorphous element regulating the magnetostriction to a minus value is selected for the layer and iron, which can set the magnetostriction toward the plus side, is used as a magnetic element. When the amorphous element sets the magnetostriction toward the minus side, the absolute value thereof can be maintained, e.g., at $2\times10^{-6}$ or less by controlling the iron concentration.

In the fourth aspect, the absolute magnetostriction value can be maintained at a predetermined value, $2\times10^{-6}$, or less by selecting an amorphous element setting the magnetostriction toward the minus side and by controlling the iron concentration as above-described.

When the film stress of the SAL is uniform and a tensile stress is in the lateral direction (the Y axis direction), the induced anisotropic magnetic field due to the magnetoelastic effect is rendered to be in the lateral direction by maintaining the magnetostriction at a plus value, thus the magnetic field of the SAL is readily saturated in the lateral direction. If an amorphous element setting the magnetostriction toward the minus side is selected in this case, it is possible to alter the value toward the plus side by controlling the iron concentration. In the fifth aspect, even though an amorphous element which sets the magnetostriction toward the minus side is used, the magnetostriction is set toward the plus side by controlling the iron concentration. The magnetization is thereby stabilized in the lateral direction, and further, the SAL can exist in an amorphous state.

The amorphous elements which are referred to in the second aspect but not in the fourth and fifth aspects fundamentally set the magnetostriction toward the plus side. Even if any of those amorphous elements is used, it is possible to stabilize the magnetization in the lateral direction when the film has a uniform stress.

The above and other objects, features and advantages of the present invention will become clear from the following description of the preferred embodiments taken in conjunction with the accompanying drawings.

Figure 8:
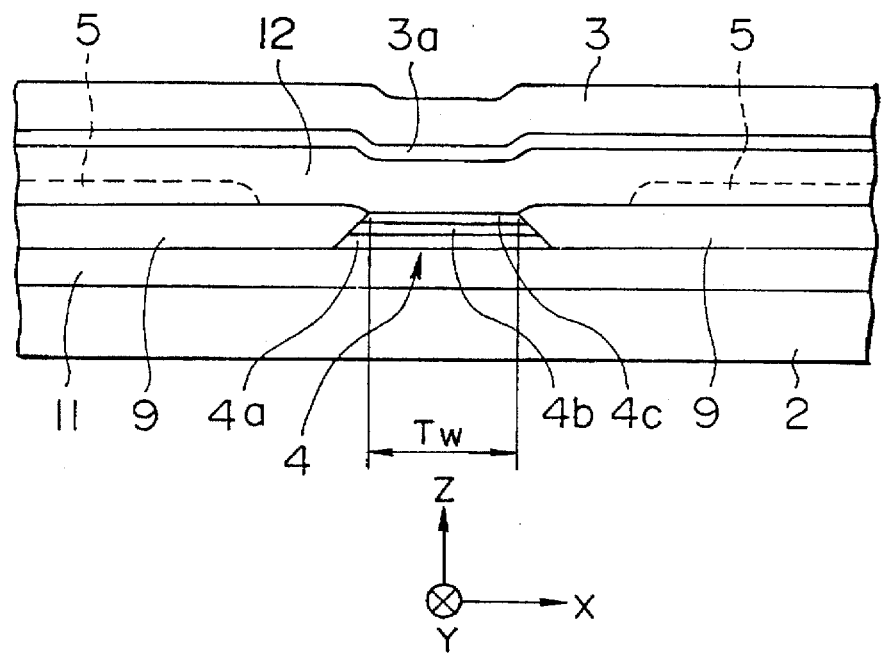
FIG. 8 is an enlarged front view of a magnetoresistive head having a hard bias layer.
Figure 9:
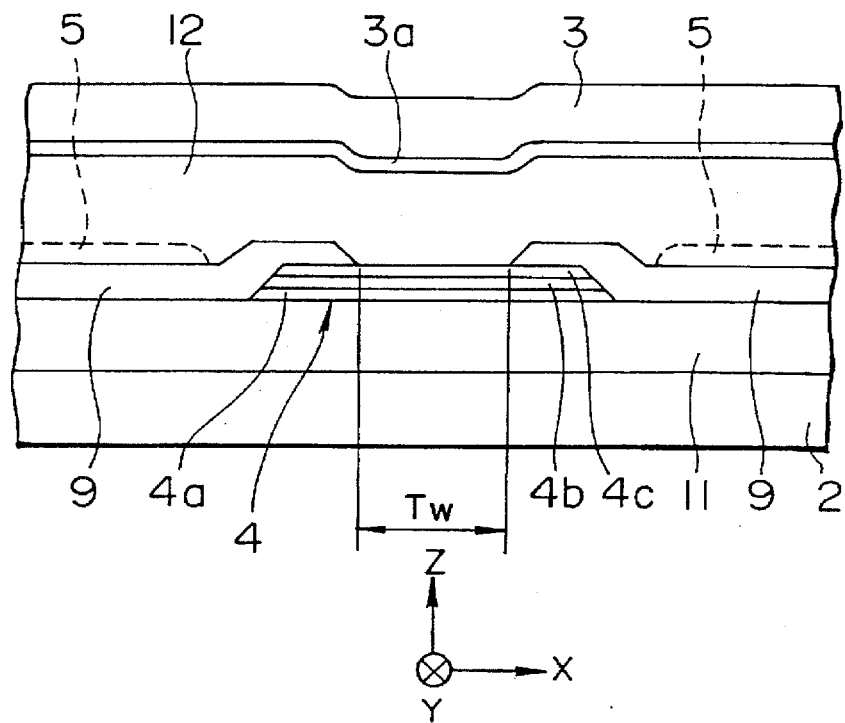
FIG. 9 is an enlarged front view of a magnetoresistive head having an exchange bias layer.

FIG. 8 shows an enlarged front view of a magnetoresistive head having a hard bias layer as a longitudinal bias layer; and FIG. 9 shows an enlarged front view of a magnetoresistive head having an exchange bias layer as a longitudinal bias layer. Each of the figures is viewed from the side of a recording medium opposed to the magnetoresistive head.

A three-layer element 4 is composed of a SAL 4a, a shunt layer 4b, and a MR layer 4c in that order from the bottom, as is shown in both FIGS. 8 and 9. The SAL 4a is composed of an amorphous magnetic material which comprises cobalt (Co) and iron (Fe) as magnetic elements and tantalum (Ta) as an amorphous element X. The shunt layer 4b is composed of tantalum (Ta) and the MR layer 4c is composed of an Ni—Fe alloy (permalloy).

In the magnetoresistive head shown in FIG. 8, a lower shield layer 2 is formed of, e.g., sendust, a lower gap layer 11 made of $Al_2O_3$, etc. is formed thereon, and the aforementioned three-layer element 4 is provided thereon. In each side of the three-layer element 4, a hard bias layer composed of, e.g., a Co—Cr—Ta (cobalt-chromium-tantalum) alloy is prepared as a longitudinal bias layer 9. Main electrode layers 5 are composed of an electrical conductive material having low electrical resistance, such as Cu (copper) or W (tungsten), and provided on the longitudinal bias layers 9 in the film in the lateral direction (the Y axis direction).

On the three-layer element 4 and the longitudinal bias layers 9, an upper gap layer 12 made of $Al_2O_3$, etc. is provided, and an undercoating layer 3a and an upper shield layer 3 made of sendust, etc. are further prepared thereon.

In FIG. 9, exchange bias layers, used as the longitudinal bias layers 9, are prepared in each side of the three-layer element 4, and further, extend to and partially cover the surface thereof. The longitudinal bias layers 9 are antiferromagnetic layers composed of, for example, an Fe—Mn (iron-manganese) alloy. The configuration of other layers shown in FIG. 9 are similar to those illustrated in FIG. 8. A reference character Tw shown in FIGS. 8 and 9 indicates the track width.

Each of the magnetoresistive heads illustrated in FIGS. 8 and 9 is arranged to face a magnetic recording medium, such as a hard disk, in the Y axis direction, which is the direction of a magnetic field leaked from the recording medium. In addition, the relative direction of the movement of the magnetoresistive head and the recording medium is in the Z axis direction.

Figure 10:
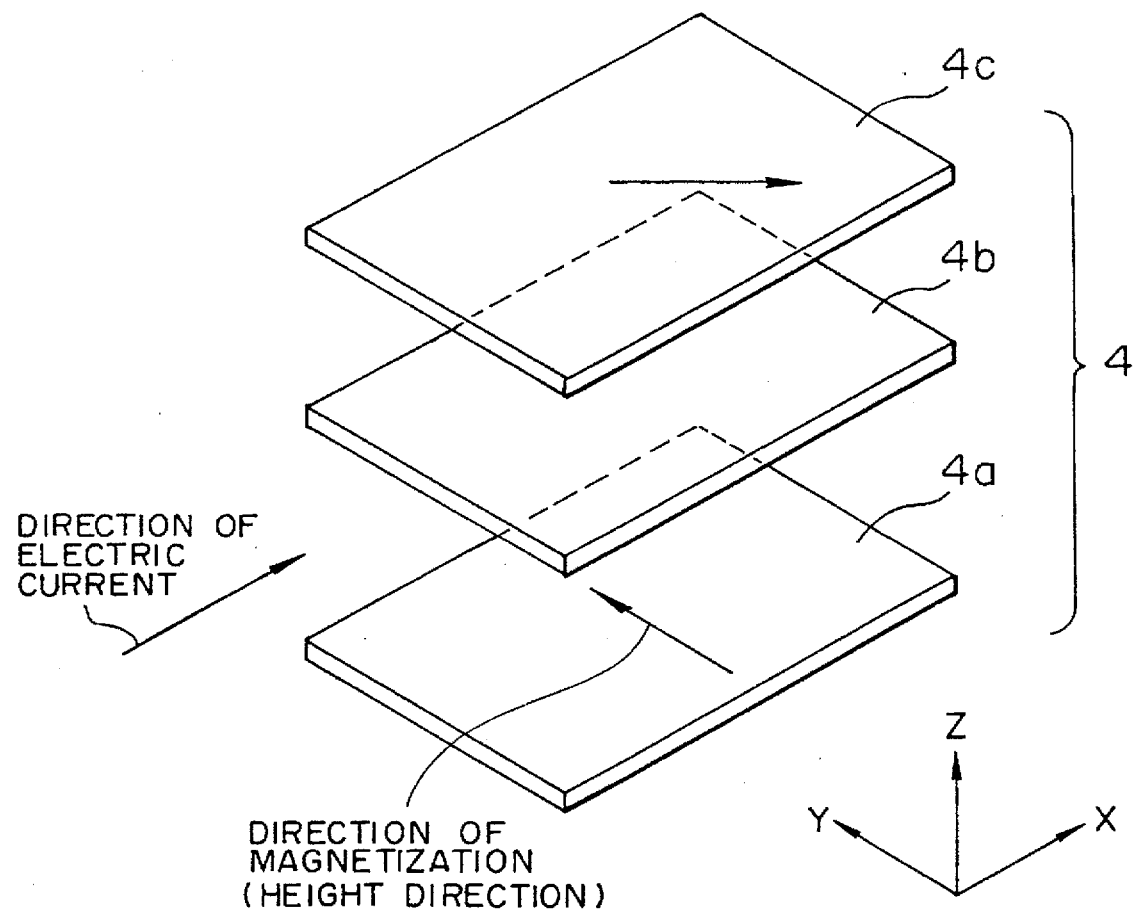
FIG. 10 is a perspective view illustrating the function of each layer of a three-layer element.

By the longitudinal bias layers 9, which are the hard bias layers or the exchange bias layers, the MR layer 4c is provided with a longitudinal bias magnetic field and is magnetized as a single domain state in the X axis direction. The detection electric current is supplied to the three-layer element 4 in the X axis direction from the main electrode layers 5 via the longitudinal bias layers 9. Then a magnetic field occurring from the MR layer 4c magnetizes the SAL 4a in the lateral direction (the Y axis direction). A transverse bias magnetic field is thereby applied to the MR layer 4c and the magnetization direction thereof is set up in the direction of the arrow shown in FIG. 10. Therefore, the resistance change due to the leakage magnetic field (an external magnetic field) provided from the magnetic recording medium in the Y axis direction becomes linear.

The relation between the properties of the SAL 4a and concentration of each element of the material thereof will be explained below.

According to the present invention, an amorphous magnetic material to which an induced anisotropic magnetic field is readily applied is used as a material for the SAL 4a. The induced anisotropy is originated from the oriented regular arrangement of the magnetic atoms and is easily attained in an amorphous film, since the magnetic atoms can be readily oriented in a regular arrangement therein. The induced anisotropy is provided in the lateral direction (the Y axis direction) by, for example, film-forming in a magnetic field or annealing in a magnetic field after film-forming.

The amorphous magnetic material comprises an amorphous element and, to readily attain the induced anisotropy, also comprises a plurality of different kinds of magnetic elements. It is preferred that a main element of the material exhibits a high Curie temperature, therefore cobalt (Co) is used. In addition to that, iron (Fe) is employed for the amorphous magnetic material because the magnetostriction of the SAL 4a is readily controlled by the iron concentration.

The amorphous element X is at least one element selected from the group consisting of tantalum (Ta), niobium (Nb), yttrium (Y), nickel (Ni), boron (B), silicon (Si), titanium (Ti), vanadium (V), chromium (Cr), zirconium (Zr), molybdenum (Mo), hafnium (Hf), and tungsten (W). Those amorphous elements are divided into two groups according to their effects on the magnetostriction. The first group consists of tantalum (Ta), niobium (Nb), yttrium (Y), and nickel (Ni). The second group consists of boron (B), silicon (Si), titanium (Ti), vanadium (V), chromium (Cr), zirconium (Zr), molybdenum (Mo), hafnium (Hf), and tungsten (W).

In the following embodiment of the present invention, tantalum (Ta), which is included in the first group above, is used. The properties thereof will be described as follows.

Figure 1:
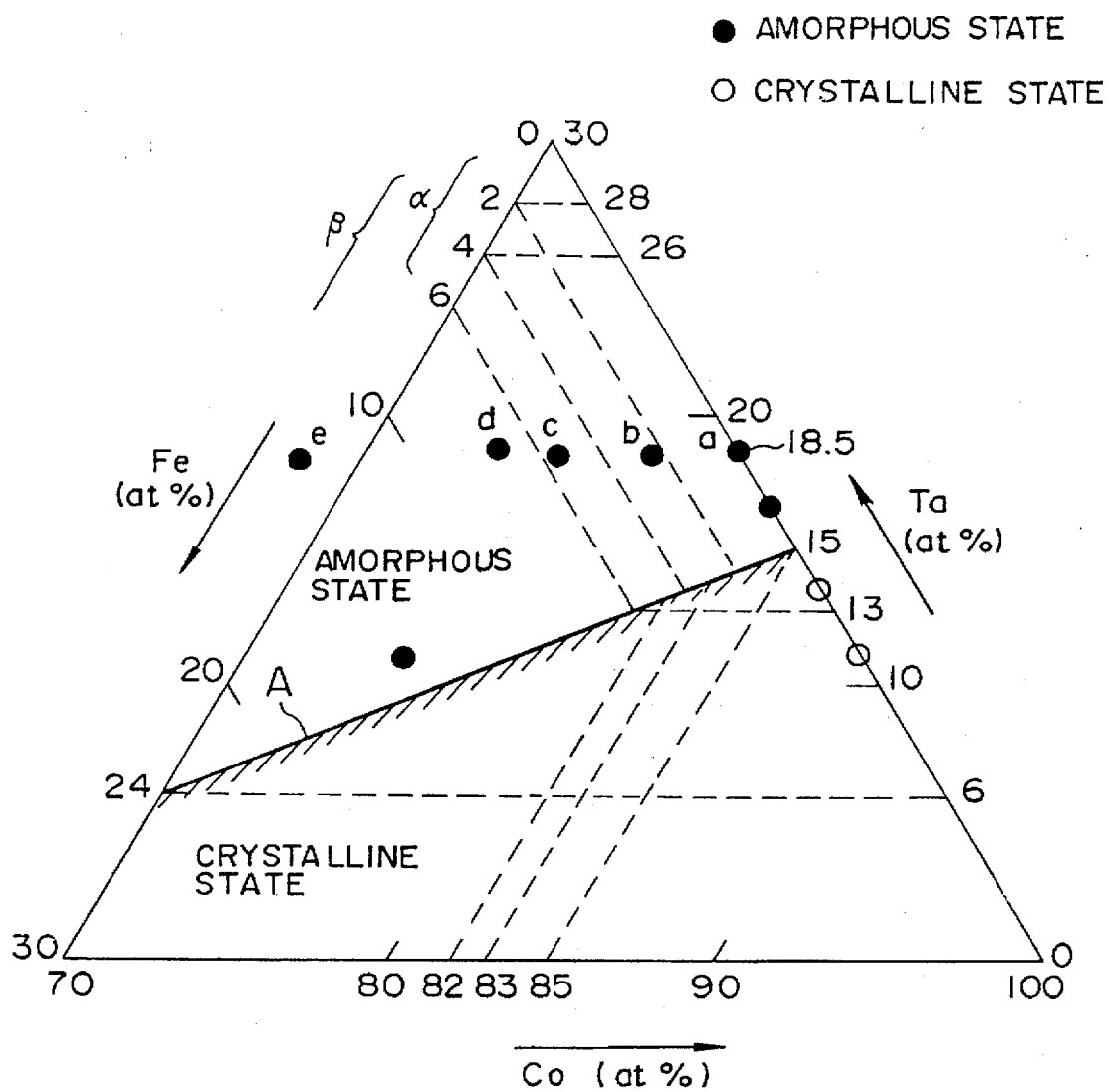
FIG. 1 is a ternary diagram showing the relation between the structure of the SAL and concentration of each element of a Co—Fe—Ta alloy used as a material thereof.

FIG. 1 is a ternary diagram showing the relation between the film state and the concentration (at %) of each element of a Co—Fe—Ta alloy composing the SAL 4a. The base line of the equilateral triangle indicates the Co (cobalt) concentration, which increases toward the right side of the figure. The left side of the equilateral triangle indicates the Fe (iron) concentration, which increases from the summit toward the base line of the equilateral triangle. The right side of the equilateral triangle indicates the Ta (tantalum) concentration, which increases from the base line toward the summit of the equilateral triangle.

Line A of the equilateral triangle indicates a boundary of the film structure where the film is in a crystalline state at the base line side or in an amorphous state at the summit side.

According to the present invention, it is required that the SAL 4a be in an amorphous state so that an induced anisotropy is readily provided thereto. To maintain the Co—Fe—Ta alloy at the amorphous state, the concentration of cobalt (Co) is 70 to 85 (at %), that of iron (Fe) is 0 to 24 (at %), and that of tantalum (Ta), which is used as an example of the amorphous element X, is 6 to 30 (at %). The SAL 4a of the embodiment of the present invention comprises the amorphous magnetic material having the above composition range.

The iron (Fe) concentration can be 0 (at %) in the above composition range. As will be explained later, it is, however, preferred that the amorphous magnetic material contains some iron (Fe) to decrease the absolute value of the magnetostriction or to increase the magnetostriction more than a predetermined value. When the film stress is uniform and the amorphous element can set the magnetostriction toward the plus side, the iron (Fe) concentration may be 0 (at %). As is shown in Table 1, compared with conventional Ni—Fe—Nb alloys, the amorphous magnetic material is superior as a material for the SAL 4a in that the induced anisotropy is readily provided thereto, the specific resistance thereof can be increased, and the rate of magnetoresistance change (ρΔ/Δ) can be decreased, even if iron (Fe) is not contained therein.

The seven kinds of the Co—Fe—Ta amorphous materials are shown as black dots in FIG. 1. In dots a, b, c, d, and e, the tantalum (Ta) concentration is fixed at 18.5 (at %), and the iron (Fe) concentration x and the cobalt (Co) concentration (81.5-x) are varied. The iron (Fe) concentration is 0 (at %) for a and approximately 14 (at %) for e, and is a value between 0 and 14 for each of b, c, and d.

Figure 2:
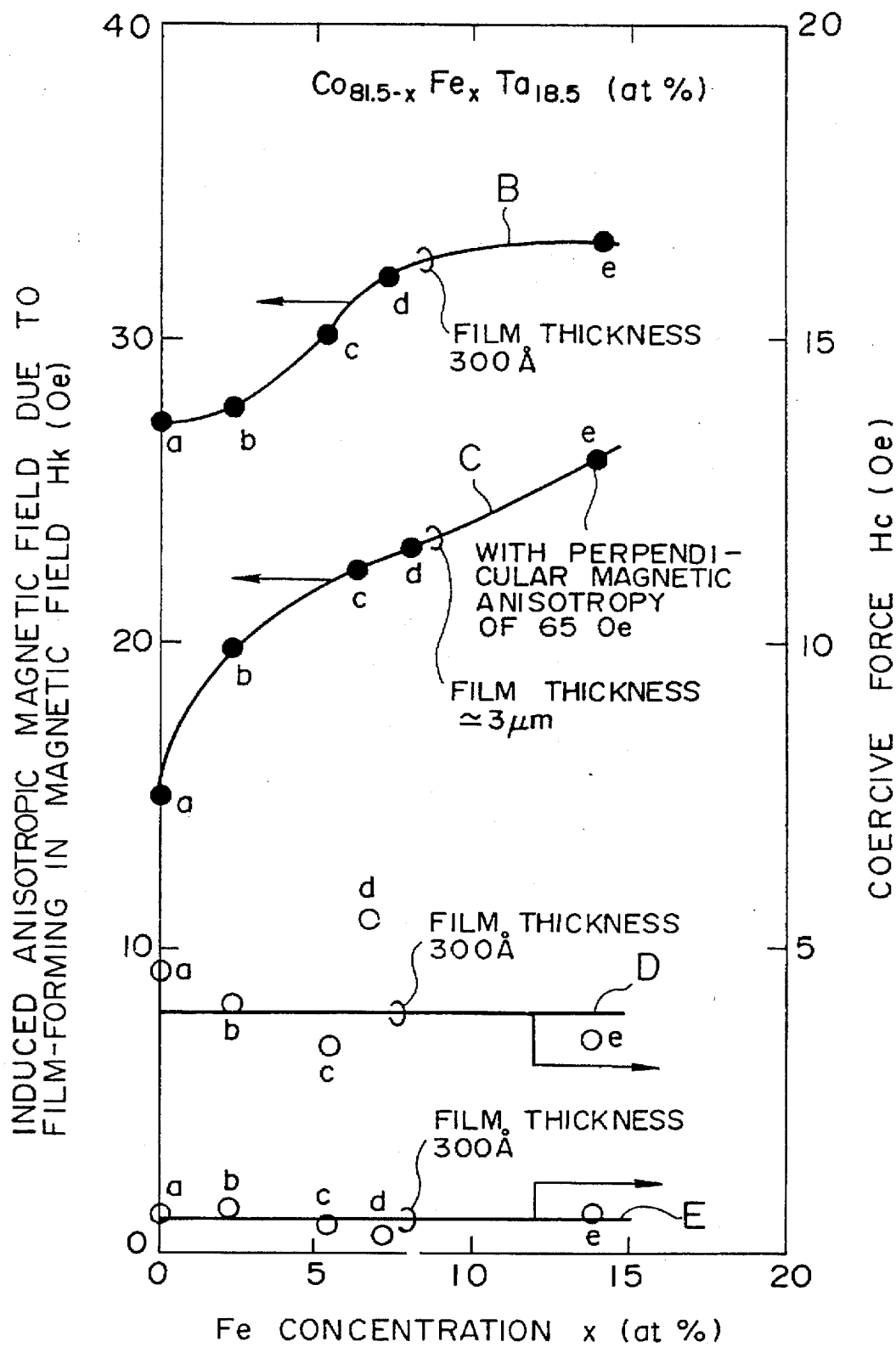
FIG. 2 is a graph showing the correlation between the induced anisotropic magnetic field, the coercive force, and the iron concentration of a Co—Fe—Ta alloy amorphous magnetic material of a SAL.

FIG. 2 shows the results of the induced anisotropic magnetic field and the coercive force estimated for the above a to e. The abscissas of the graph in FIG. 2 indicates the iron (Fe) concentration (at %) and the left ordinates shows the induced anisotropic magnetic field Hk (Oe) of the SAL 4a film-formed in a magnetic field. B and C indicate the induced anisotropic magnetic field estimated for the above a to e when the film thickness is set to 300 Å and 3 μm, respectively.

The strength of the induced anisotropic magnetic field is in a range of from 27 to 33 (Oe) in B, and from 15 to 26 (Oe) in C. Compared with the Ni—Fe—Nb alloy which is shown in Table 1 and used as a material for a conventional SAL 4a, in both B and C, the induced anisotropic magnetic field is large and the magnetization can be readily saturated in the lateral direction (the Y axis direction shown in FIG. 10) when the induced anisotropy is applied in the Y direction. Recently, a magnetoresistive head used for a hard disc has a thinner three-layer element 4 so as to reproduce high-density signals, and the film thickness of the SAL 4a is set to approximately 300 Å. In this case, the induced anisotropic magnetic field of the Co—Fe—Ta amorphous magnetic material becomes significantly larger, as is shown in FIG. 2 and Table 1.

The right ordinates in FIG. 2 show the coercive force Hc (Oe). In FIG. 2, D and E respectively indicate the coercive force in the direction of the easy magnetization axis and the hard magnetization axis when the film thickness is set to 300 Å for a to e. It is understood from the graph that the coercive force in the direction of easy magnetization axis is so low as less than 5 (Oe) when the film thickness is approximately 300 Å, thus those Co—Fe—Ta alloys are considered to be suitable materials for the SAL 4a.

Figure 3:
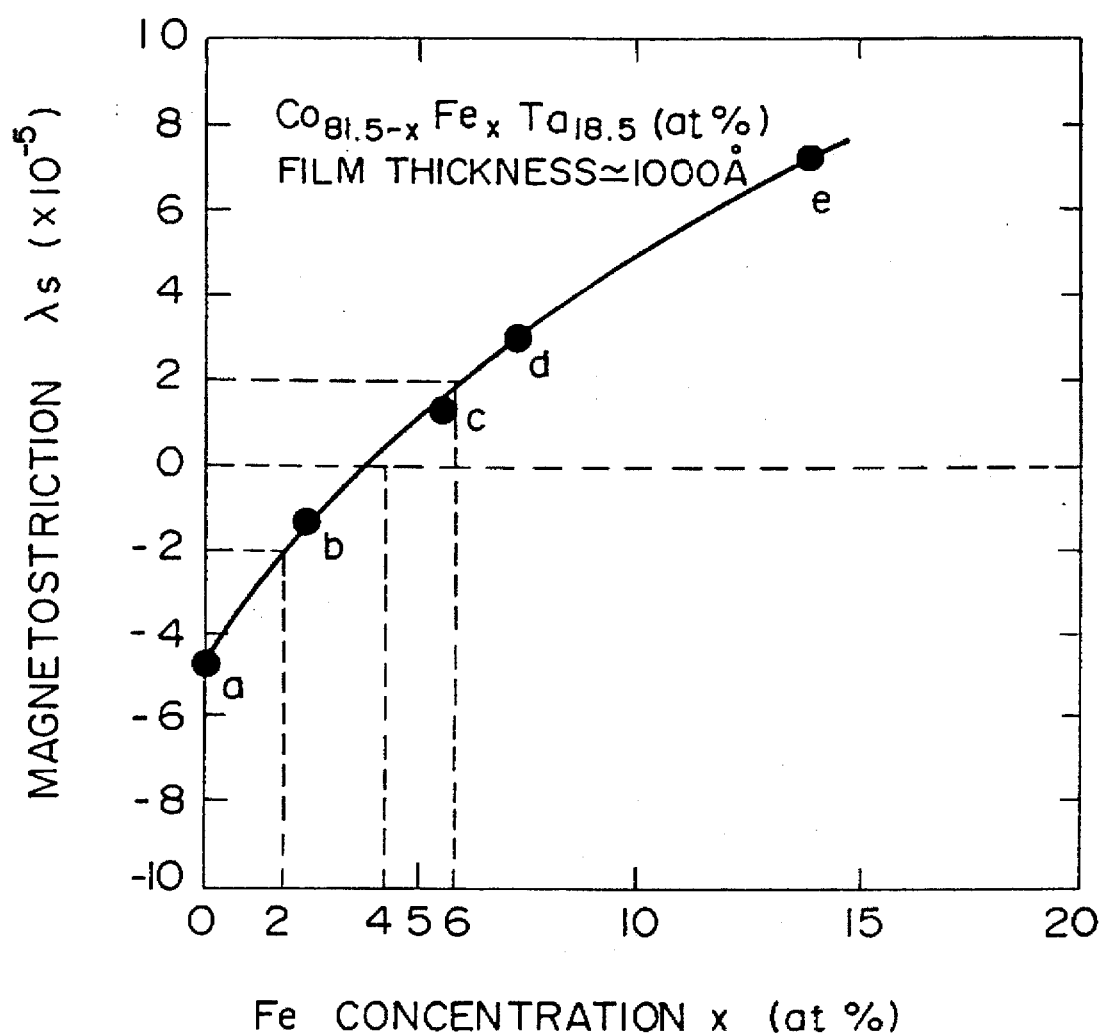
FIG. 3 is a graph showing the relation between the magnetostriction and the iron concentration of a Co—Fe—Ta alloy amorphous magnetic material of a SAL.

FIG. 3 shows the relation between the iron (Fe) concentration (at %) and the magnetostriction $\lambda s$ (x $10^{-6}$) with respect to the Co—Fe—Ta alloys of the above a to e. It is understood from FIG. 3 that the magnetostriction $\lambda s$ becomes larger in correspondence with an increase in the iron (Fe) concentration. The reason for this phenomenon is as follows. Tantalum (Ta) included in the foregoing first group is selected as an amorphous element of the Co—Fe—Ta alloys of the above a to e. While tantalum (Ta) can set the magnetostriction toward the minus side, iron (Fe) sets the magnetostriction toward the plus side. In the case of an amorphous magnetic material containing both tantalum (Ta) and iron (Fe), it is therefore easy to adjust the absolute magnetostriction value to 0 or near 0 by increasing the iron (Fe) concentration. The relation between the magnetostriction and the film stress, which affects the anisotropic magnetic field, will be described later.

Figure 4:
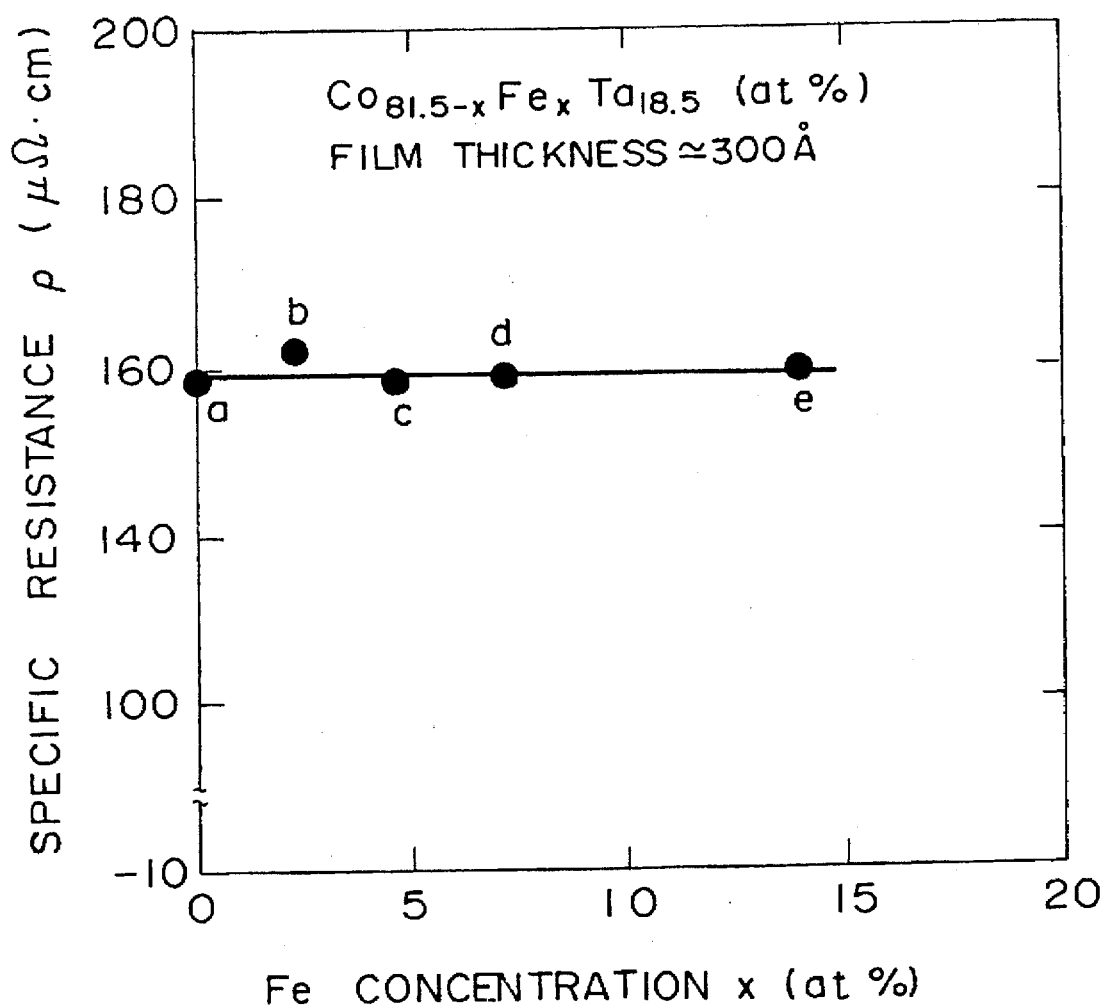
FIG. 4 is a graph showing the relation between the specific resistance and the iron concentration of a Co—Fe—Ta alloy amorphous magnetic material of a SAL.

FIG. 4 shows the relation between the iron (Fe) concentration (at %) and the specific resistance ρ (μΩ.cm) when the films for a to e are 300 Å thick. The specific resistance ρ is not largely affected by the iron (Fe) concentration and is as high as 160 (μΩ.cm) for a to e. It is understood that the specific resistance of the SAL 4a can be set to a high value so as to prevent the electric current to be applied to the MR layer 4c from flowing into the SAL 4a.

Figure 5:
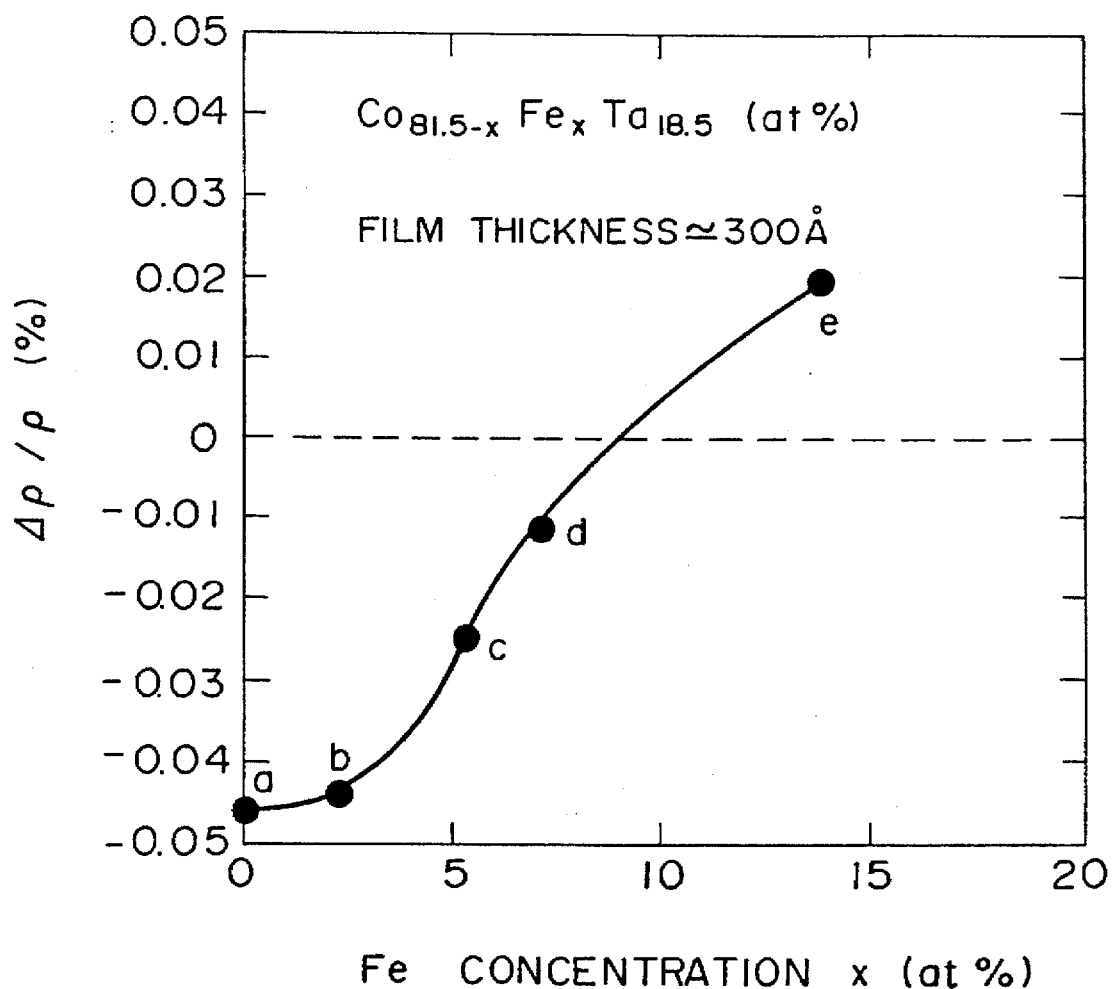
FIG. 5 is a graph showing the relation between the rate of magnetoresistance change and the iron concentration of a Co—Fe—Ta alloy amorphous magnetic material of a SAL.

FIG. 5 illustrates the relation between the iron (Fe) concentration (at %) and the rate of magnetoresistance change (Δρ/ρ) (%) when the films for a to e are 300 Å thick. It is understood from the graph that the rate of magnetoresistance change becomes larger in correspondence with an increase in the iron (Fe) concentration, and that the rate of magnetoresistance change is as small as 0.02% or less when the iron (Fe) concentration is 14 (at %) or less. Therefore, in the SAL 4a using those amorphous magnetic materials, the magnetization stability is not readily affected in the lateral direction by an external magnetic field.

Figure 6:
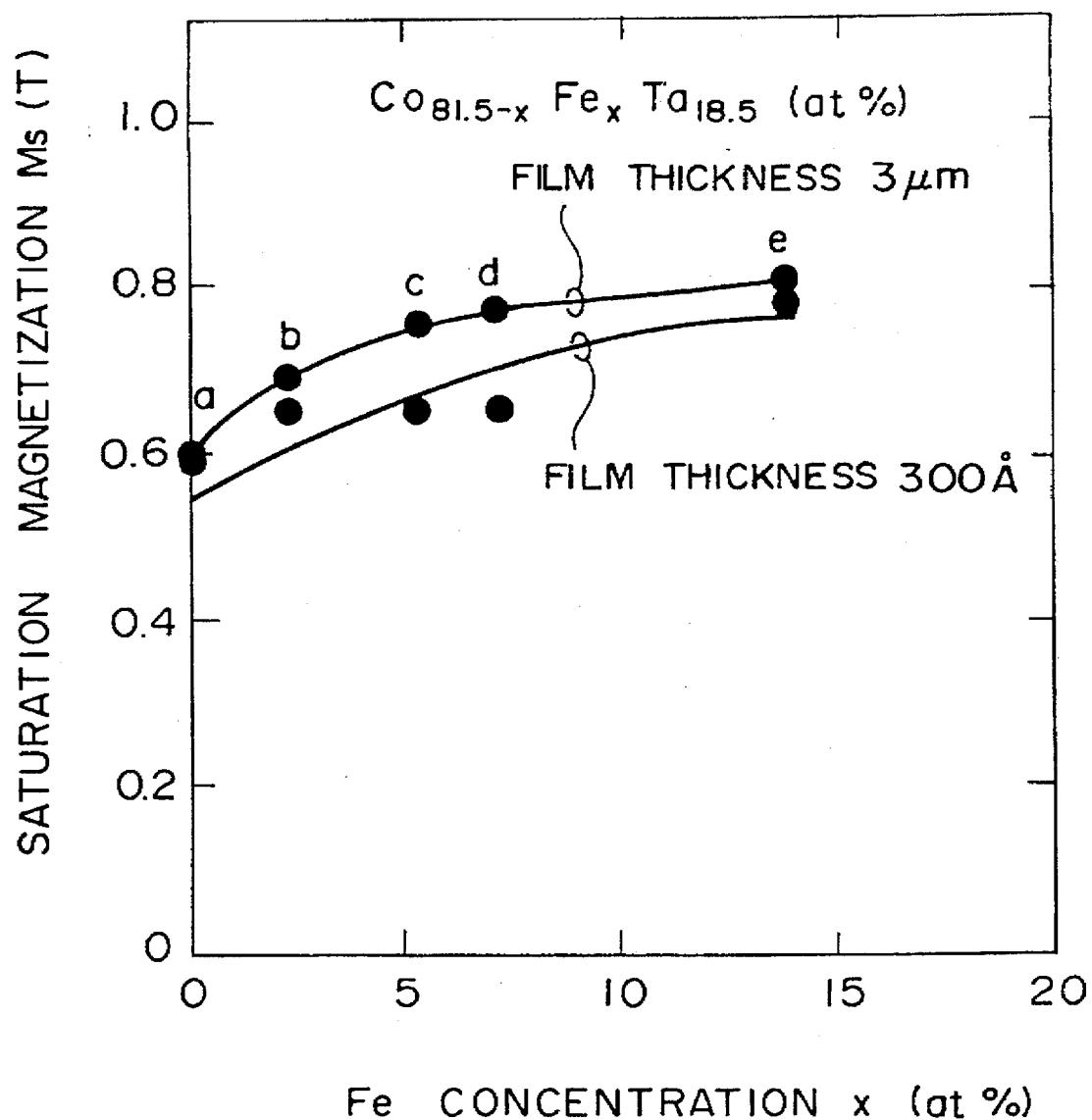
FIG. 6 is a graph showing the relation between the saturation magnetization and the iron concentration of a Co—Fe—Ta alloy amorphous magnetic material of a SAL.

FIG. 6 illustrates the relation between the iron (Fe) concentration (at %) and the saturation magnetization Ms (T) when the films for a to e are 300 Å thick. It is understood from the graph that the saturation magnetization Ms is in a range of from 0.6 to 1.0 (T) for a to e and that those Co—Fe—Ta alloys are suitable materials for the SAL 4a. The following Table 1 shows the comparison of the above properties between the conventional Ni—Fe—Nb materials for the SAL 4a and the amorphous magnetic materials comprising the Co—Fe—Ta alloys of a to e.

TABLE 1

|  | NiFeNb | CoFeTa |
| --- | --- | --- |
| $\lambda s$ | about 0 | about 0 |
| ρ (μΩ · cm) | 60 to 80 | 160 |

TABLE 1-continued

|  | NiFeNb | CoFeTa |
| --- | --- | --- |
| Δρ/ρ (%) | 0.1 to 0.2 | <0.02 |
| Bs (T) | 0.6 to 0.8 | 0.6 to 0.8 |
| Hk (Oe) | 3 to 5 | 27 to 33 (film thickness of 300Å) |

It is understood from Table 1 that, among the functional requirements for the SAL 4a, the induced anisotropic magnetic field Hk, the specific resistance ρ, and the rate of magnetoresistance change (Δρ/ρ) of the Co—Fe—Ta amorphous magnetic materials are superior to those of the conventional Ni—Fe—Nb materials.

In addition, by using an amorphous material for the SAL, it is possible to decrease the coercive force and to apply the induced anisotropy more readily. Further, instead of tantalum (Ta), other elements can be used as the amorphous element with Co (cobalt) and Fe (iron) to make similar amorphous magnetic materials, providing almost the same properties as shown in the right column of Table 1.

The following amorphous elements included in the foregoing first or second group exhibit similar properties to tantalum (Ta); niobium (Nb), yttrium (Y), nickel (Ni), boron (B), silicon (Si), titanium (Ti), vanadium (V), chromium (Cr), zirconium (Zr), molybdenum (Mo), hafnium (Hf), and tungsten (W). When an alloy contains at least one of the above amorphous elements, cobalt (Co), and iron (Fe) in a concentration range of the amorphous state shown in FIG. 1, it exhibits superior properties as a material for the SAL 4a as compared to conventional materials.

It is understood from FIG. 1 that an amorphous magnetic material exhibits almost the same properties as shown in the right column of Table 1, when the alloy thereof contains at least one of the above amorphous elements at a concentration of 6 to 30 (at %), cobalt (Co) at a concentration of 70 to 85 (at %), and iron (Fe) at a concentration of 0 to 24 (at %).

The following is an explanation of an influence in the magnetization direction, which is referred to a magnetoelastic effect, due to the correlation between the film stress and the magnetostriction of the SAL 4a.

When the film stress and the magnetostriction of a magnetic material are respectively referred to σ and λs, the following formula is obtained:

$$Hk \propto |\lambda s| \cdot \sigma \quad \text{formula 1}$$

The magnetoelastic energy E is represented by the film stress σ and the magnetostriction λs:

$$E = \tfrac{3}{2} \cdot \lambda s \cdot \sigma \quad \text{formula 2}$$

The conversion of the magnetoelastic energy E to the anisotropic magnetic field Hk is as follows;

$$E = \tfrac{1}{2} \cdot Ms \cdot Hk \quad \text{formula 3}$$

$$Hk = 3 \cdot |\lambda s| \cdot \sigma / Ms \quad \text{formula 4}$$

wherein Ms is the saturation magnetization.

FIG. 7 illustrates the relation between the anisotropic magnetic field Hk due to the magnetoelastic effect and the absolute value of the magnetostriction λs ($\times 10^{-6}$) or the film stress σ {Mpa (megapascal)=$10^7$ (dyn/cm$^2$)} when Ms=0.6 (T) (see FIG. 6) in the formulae 4. It is understood from FIG. 7 that the anisotropic magnetic field Hk due to the magnetoelastic effect becomes larger in correspondence with an increase in the film stress or the magnetostriction.

The influence of the anisotropic magnetic field Hk due to the magnetoelastic effect caused by the correlation between the film stress and the magnetostriction varies depending on the uniformity of the film stress of the SAL 4a.

When the strength, which means the strength of the tensile stress or compressive stress, and direction of the film stress are nonuniform, those of the anisotropic magnetic field Hk, shown as Hk in FIG. 7, also become nonuniform. In the SAL 4a, the magnetization stability in the lateral direction (in the Y axis direction) is thereby affected and disturbed by the aforementioned anisotropic magnetic field Hk due to the magnetoelastic effect.

It is therefore necessary to make the above anisotropic magnetic field Hk due to the magnetoelastic effect as low as possible when the strength and direction of the film stress are nonuniform in the SAL 4a. The strength of the anisotropic magnetic field directed in the lateral direction by the SAL bias is in general approximately 50 to 200 (Oe). Thus, in order to suppress Barkhausen noise due to the SAL bias (the transverse bias), it is preferred that the strength of the anisotropic magnetic field due to the magnetoelastic effect be controlled to 10 (Oe) or less.

In addition, the stress provided to the SAL 4a several hundreds Å thick is approximately 100 MPa (megapascal) or less. FIG. 7 indicates that when the film stress is 100 MPa or less and the anisotropic magnetic field due to the magnetoelastic effect is approximately 10 (Oe) or less, the absolute value of the magnetostriction λs is required to be $2 \times 10^{-6}$ or less.

The amorphous element X is required to be capable of setting the magnetostriction λs to a minus value so as to control the absolute value of the magnetostriction λs in the above-mentioned range. When an amorphous element, such as tantalum (Ta), satisfies the above requirement, it is possible to control the magnetostriction λs toward the plus side to cancel the minus shift of the magnetostriction by increasing the iron (Fe) concentration, as shown in FIG. 3. It is understood from FIG. 3 that the iron (Fe) concentration is required to range from 2 to 6 (at %) to maintain the absolute value of the magnetostriction λs at $2 \times 10^{-6}$ or less.

A reference character in FIG. 1 indicates the iron (Fe) concentration range of 2 to 6 (at %). To obtain a Co—Fe—Ta alloy which is in an amorphous state and which has the above iron (Fe) concentration range, the concentrations for cobalt (Co) and tantalum (Ta) are 70 to 83 (at %) and 13 to 28 (at %), respectively. In other words, when the SAL 4a is composed of the Co—Fe—Ta alloy and the strength and direction of the film stress are nonuniform, the preferable concentrations for iron (Fe), cobalt (Co), and tantalum (Ta) are respectively 2 to 6 (at %), 70 to 83 (at %), and 13 to 28 (at %) to prevent the magnetoelastic effect from disturbing the magnetization in the lateral direction.

The same thing can be applied even if other amorphous elements are used instead of tantalum (Ta). By using other amorphous elements capable of setting magnetostriction λs toward the minus side, almost the same properties as those shown in FIGS. 3 and 7 are observed, especially when at least one of niobium (Nb), yttrium (Y), and nickel (Ni), which elements are included in the foregoing first group, is employed. Therefore, when one of the elements included in the foregoing first group is used for the SAL 4a and the strength and direction of the film stress are nonuniform, the preferable concentrations for iron (Fe), cobalt (Co), and the amorphous element X are 2 to 6 (at %), 70 to 83 (at %), and 13 to 28 (at %), respectively.

When the film stress of the SAL 4a is uniform in direction, for instance, exists as a tensile stress in the lateral direction, the induced anisotropic magnetic field (Hk) due to the magnetoelastic effect enhances the magnetization stability of the SAL 4a in the lateral direction, if the magnetostriction λs has been set to a plus value. With respect to the Co—Fe—Ta amorphous magnetic material shown in FIG. 3, the magnetostriction λs can be set to a plus value by controlling the iron (Fe) concentration to 4 (at %) or more, the magnetoelastic effect thereby enhances the magnetization stability of the SAL 4a in the lateral direction.

A reference character β in FIG. 1 indicates the iron (Fe) concentration range of 4 (at %) or more. To obtain a Co—Fe—Ta alloy in an amorphous state in the β range, the concentrations for iron (Fe), cobalt (Co), and tantalum (Ta) are 24 (at %) or less, 70 to 82 (at %), and 6 to 26 (at %), respectively. When the SAL 4a is composed of the Co—Fe—Ta alloy and has a uniform film stress, each concentration of iron (Fe), cobalt (Co), and tantalum (Ta) is preferably in the foregoing corresponding range. Moreover, the magnetization stability in the lateral direction is still more enhanced by the induced anisotropic magnetic field (Hk) due to the magnetoelastic effect when the magnetostriction λs is further set toward the plus side, as shown in FIG. 3. Therefore, the iron (Fe) concentration is preferably 6 (at %) or more, and more preferably, 10 (at %) or more.

As explained above, niobium (Nb), yttrium (Y), and nickel (Ni) which are included in the foregoing first group, set the magnetostriction to the minus side. By increasing the iron (Fe) concentration, the magnetostriction can be adjusted toward 0 or a plus value. It is thus possible to select the iron (Fe) concentration in a similar range to that shown in FIG. 3, if one of the elements of the foregoing first group is used for the SAL 4a.

Therefore, when the SAL 4a having a uniform film stress is composed of iron (Fe), cobalt (Co), and one of the elements of the foregoing first group, it is preferred that the concentrations for iron (Fe), cobalt (Co), and the amorphous element X are respectively 4 to 24 (at %), 70 to 82 (at %) and 6 to 26 (at %) to enhance the magnetization stability in the lateral direction.

In addition, boron (B), silicon (Si), titanium (Ti), vanadium (V), chromium (Cr), zirconium (Zr), molybdenum (Mo), hafnium (Hf), and tungsten (W), which elements are included in the foregoing second group, set the magnetostriction λs toward the plus side. The magnetization of the SAL 4a can be thus stabilized in the lateral direction by using at least one of those elements, Co (cobalt), and Fe (iron), including the iron concentration of 0 (at %), for the amorphous magnetic material when the SAL has a uniform film stress.

As is shown above, in the present invention, the suppression of Barkhausen effect is achieved by stabilizing the saturation magnetization in the lateral direction and by decreasing the rate of magnetoresistance change (Δρ/ρ) of the SAL of a three-layer element. It is also possible to increase the specific resistance ρ so as to prevent the electric current to be applied to the MR layer from flowing into the SAL.

Moreover, when an amorphous magnetic material used for the SAL contains at least one of the amorphous elements in the foregoing first group, the magnetization stability in the lateral direction is enhanced in both cases of the film stress being either uniform or nonuniform by selecting the iron (Fe) concentration.

Further, when one of the amorphous elements of the foregoing second group is used, the magnetization stability in the lateral direction is enhanced if the film has a uniform stress.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. An anisotropic magnetoresistive head comprising:

a magnetoresistive layer and a soft adjacent layer stacked with a non-magnetic layer therebetween; and an electric-current supplying path for said magnetoresistive layer;

wherein said soft adjacent layer comprises an amorphous magnetic material comprising magnetic elements including cobalt (Co), iron (Fe) and an amorphous element X;

wherein said amorphous element X is at least one element selected from the group consisting of tantalum (Ta), niobium (Nb), yttrium (Y), nickel (Ni), boron (B), silicon (Si), titanium (Ti), vanadium (V), chromium (Cr) zirconium (Zr), molybdenum (Mo), hafnium (Hf), and tungsten (W);

wherein the cobalt (Co) concentration is in the range of 70 to 85 (at %);

wherein the iron (Fe) concentration is in the range of 0 to 24 (at %); and wherein the amorphous element X concentration is in the range of 6 to 30 (at %); and wherein said amorphous magnetic material has a composition within a range denoted by three coordinates (70,24,6), (70,0,30) and (85,0,15) in a (Co,Fe,X) ternary diagram.

2. An anisotropic magnetoresistive head as set forth in claim 1, wherein a strength and a direction of film stress of said soft adjacent layer are nonuniform;

wherein said amorphous element X is at least one element selected from the group consisting of tantalum (Ta), niobium (Nb), yttrium (Y), and nickel (Ni);

wherein the iron (Fe) concentration ranges from 2 to 6 (at %);

wherein the cobalt (Co) concentration ranges from 70 to 83 (at %); and wherein the amorphous element X concentration ranges from 13 to 28 (at %).

3. An anisotropic magnetoresistive head according to claim 2, wherein said soft adjacent layer has a magnetostriction value λs in the range of $-2\times10^{-6} \leq \lambda s \leq 2\times10^{-6}$.

4. An anisotropic magnetoresistive head as set forth in claim 1, wherein said soft adjacent layer has uniform film stress, where said uniform film stress comprises tensile stress;

wherein said amorphous element X includes at least one element selected from the group consisting of tantalum (Ta), niobium (Nb), yttrium (Y), and nickel (Ni);

wherein the iron (Fe) concentration ranges from 4 to 24 (at %);

wherein the cobalt (Co) concentration ranges from 70 to 82 (at %); and wherein the amorphous element X concentration ranges from 6 to 26 (at %).

5. An anisotropic magnetoresistive head according to claim 4, wherein said Fe concentration is in the range of 6 to 24 (at %).

6. An anisotropic magnetoresistive head according to claim 5, wherein said Fe concentration is in the range of 10 to 24 (at %).

7. An anisotropic magnetoresistive head as set forth in claim 1, wherein said soft adjacent layer has uniform film stress; and said amorphous element X includes at least one element selected from the group consisting of boron (B), silicon (Si), titanium (Ti), vanadium (V), chromium (Cr), zirconium (Zr), molybdenum (Mo), hafnium (Hf), and tungsten (W).

8. An anisotropic magnetoresistive head according to claim 1, wherein said soft adjacent layer has a thickness in the range of 300 angstroms to 3 μm.

9. An anisotropic magnetoresistive head according to claim 8, wherein said soft adjacent layer has a thickness of approximately 300 angstroms.

10. An anisotropic magnetoresistive head according to claim 9, wherein said soft adjacent layer has a specific resistance $\rho$ in the range of $80 < \rho \leq 160$ (μΩ.cm).

11. An anisotropic magnetoresistive head according to claim 10, wherein said soft adjacent layer has a specific resistance $\rho$ of approximately 160 (μΩ.cm).

12. An anisotropic magnetoresistive head according to claim 9, wherein said soft adjacent layer has a rate of magnetoresistance change $\Delta\rho/\rho$ of $-0.05 < \Delta\rho/\rho < 0.02$.

* * * * *